United States Patent
Lacaze et al.

(10) Patent No.: US 6,519,170 B2
(45) Date of Patent: Feb. 11, 2003

(54) METHOD FOR OPERATING A MATRIX CONVERTER AND MATRIX CONVERTER FOR IMPLEMENTING THE METHOD

(75) Inventors: Alain Lacaze, Essert (FR); Sylvie Turri, Port-sur-Saône (FR)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/977,295

(22) Filed: Oct. 16, 2001

(65) Prior Publication Data

US 2002/0093840 A1 Jul. 18, 2002

(30) Foreign Application Priority Data

Oct. 16, 2000 (DE) .......................... 100 51 222

(51) Int. Cl.⁷ .............................................. H02M 5/06
(52) U.S. Cl. ...................................................... 363/152
(58) Field of Search ................................ 363/148, 149, 363/152, 9, 10, 65

(56) References Cited

U.S. PATENT DOCUMENTS

| | | | |
|---|---|---|---|
| 4,439,823 A | | 3/1984 | Gyugyi, et al. |
| 4,697,131 A | * | 9/1987 | Schauder et al. ........... 318/762 |
| 5,594,636 A | | 1/1997 | Schauder |
| 5,852,559 A | * | 12/1998 | Li .............................. 363/163 |
| 5,949,672 A | | 9/1999 | Bernet |
| 6,058,028 A | * | 5/2000 | Czerwinski .................. 363/44 |

FOREIGN PATENT DOCUMENTS

| | | |
|---|---|---|
| CH | 643694 | 6/1984 |
| DE | 3502204 C2 | 8/1986 |
| EP | 0677920 B1 | 12/1999 |
| FR | 2438936 | 5/1980 |
| GB | 2113488 | 8/1983 |

OTHER PUBLICATIONS

Cittadini, et al., "A Matrix Converter Switching Controller for Low Losses Operation without Snubber Circuits", Laboratoire d'Electrotechnique de Montpellier Conference Paper, pp. 4.199–4.2030(Mar. 31, 2000).

Ziegler, M., et al., "A New Two Steps Commutation Policy for Low Cost Matrix Converters", Chemnitz University of Technology Conference Paper, 6 pages, (Nov. 22, 2000).

"1–4–3 Matrix Converter as a Power Processor", from Power Electronics, Converters, Applications, and Design, $2^{nd}$ Ed., Mohan N., et al., pp. 11–12, John Wiley & Sons, Inc. (Jan. 1995).

European Search Report dated Sep. 12, 2002.

* cited by examiner

Primary Examiner—Matthew Nguyen
(74) Attorney, Agent, or Firm—Burns, Doane, Swecker & Mathis, L.L.P.

(57) ABSTRACT

In a method for operating a matrix converter (10) in which m phases (G1, . . . ,G6) of a source (11) delivering an alternating voltage are alternatingly connected with n phases (L1, . . . ,L3) of a load (12) via a multiple number of controllable bi-directional switches (14) arranged in an (m×n) matrix, an increased performance at decreased expenditure becomes possible in that switching over from a first phase (G1) of the source (11) to a second phase (G1) of the source (11) only takes place if the condition $$I_k \cdot (V_k - V_l) \cdot K_{ijkl} < 0$$

is met, where $I_k$ and $V_k$ are the current and the voltage of the first phase (G1), $V_l$ is the voltage of the second phase (G1) and in each instance $K_{ijkl}$ is a characteristic constant for the mutual inductance between the phases (G1, . . . ,G6) of the source (11) and the inductance of the load (12).

7 Claims, 2 Drawing Sheets

METHOD FOR OPERATING A MATRIX CONVERTER AND MATRIX CONVERTER FOR IMPLEMENTING THE METHOD

TECHNICAL FIELD

The present invention relates to the field of power electronics and in particular to power generation with a synchronous generator which is operated above the synchronous mains frequency, as well as the drive of variable-speed synchronous motors and induction motors.

The invention relates to a method for operating a matrix converter according to the precharacterising part of claim 1. It further relates to a matrix converter for implementing the method.

STATE OF THE ART

In power generation, at a specified output, an increase of the rotary speed of a turbine is associated with a decrease in size and costs. Efficiency, too, can be improved. Already, power generation turbines up to 70 MW are connected to generators by way of gearing arrangements, so as to allow operation at higher rotary speeds. As the output increases, the use of gearing arrangements becomes increasingly difficult for safety reasons. In such cases, the turbine is operated at synchronous speed.

The use of a gearing arrangement is associated with the following disadvantages:
  a fixed transmission ratio;
  a noise level above 100 db for 40 MW, and above 115 db for 70 MW;
  mechanical losses irrespective of the particular load; and
  exacting requirements with regard to cooling and lubrication with oil.

The use of static frequency converters (power electronics) represents an alternative. The following advantages could be expected:
  reduced costs of the generator in agreement with a constant product of volume and rotational speed;
  a standardised generator for both 50 and 60 Hz;
  an adjustable speed which allows restoration of the partial-load efficiency of the turbine;
  reduced losses in relation to the gearing arrangement, at least in partial load;
  a substantial reduction in noise;
  clean (oil-free) cooling;
  no upper limit of the possible output, resulting in a significant reduction in the cost of the turbine by keeping it small—an option not provided by a gearing arrangement; and
  use of the generator as a starter motor (in the case of gas turbine applications).

Both in the case of power generation and in the case of drives, a reduction in losses of the static frequency converters would bring about substantial cost savings. A reduction of the losses would above all have a bearing on investment costs because cooling accounts for a substantial part of the total costs of the converter.

Furthermore, reduced cooling requirements provide the option of keeping the electronics more compact, thus facilitating integration of the power electronics in the electric power station or even in the generator unit. Close integration of the power electronics in the generator unit would provide the additional advantage of short connection lines, shared coolant devices and a smaller overall volume (savings in building costs).

In the field of large drives of up to several 10 MW, these advantages also arise from the reduced losses, thus providing a competitive advantage compared to direct mechanical drives of a turbine.

Static frequency converters exist both with indirect AC/DC/AC conversion and with direct AC/AC conversion.

The indirect conversion (AC/DC/AC) is caused by generating a directed direct current or a directed direct voltage from the three-phase source (mains in the case of motors; generator in the case of power generation). Subsequently, the direct current or the direct voltage is converted back to an alternating current by means of an inverter.

An inductance (current converter) or a capacitor bank (voltage converter) are switched into the intermediate circuit so as to reduce the ripple component of the current or the spikes.

These days, converters make use of thyristors. If natural commutation of the thyristors is possible, the losses in the converter are reduced. However, induction motors for example, take up reactive power. In order to make this reactive power from the net available, it should be possible to switch off the current in a specified arm of the converter at any desired time. In this case there is forced commutation and thus there are increased losses. In the electrical machine (generator or motor), the phase currents are chopped direct currents. The armature reaction does not rotate at constant speed and amplitude but instead jumps around according to the commutation cycle. A 6-pulse or 12-pulse converter provides six or twelve different angular positions for the armature reaction. This results in strongly pulsating torques and large additional losses in the electrical machine which can lead to deterioration of the machine. In 12-pulse converters the effect is 4 times smaller than in 6-pulse converters.

Voltage converters use GTOs with their inherent high switching losses, as well as IGBTs or IGCTs. The power of the individual components is less than that of thyristors, consequently, a larger number of components are required for a specified voltage or a specified current. Voltage converters can benefit from the use of pulse-width modulation techniques which improve the shape of the current curves and reduce the harmonics. The higher the switching frequencies the better, except with regard to losses and dielectric fatigue. The curve shape of the current can largely be sine-shaped so that a decrease of power of the electrical machine is avoided.

Direct conversion (AC/AC) is for example possible by means of a so-called cyclo-converter. Direct conversion provides significant advantages from the point of view of the electrical machine, because the current is more or less a sine-shaped wave rather than chopped direct current. It reduces the losses which occur additionally within the electrical machine and it also prevents pulsating torques.

However, the use of cyclo-converters limits the achievable frequency range to 0–⅓ of the input frequency. Due to imbalanced operation, exceeding the ⅓ limit results in overdimensioning up to a factor of 3.

Another possibility of direct conversion is provided by a so-called matrix converter in which each phase of a multi-phase source (generator or mains) is connected or connectable with each phase of a multi-phase load (mains, passive load, motors, etc.) by a bi-directional switch (see e.g. N. Mohan et al., Power Electronics, 2nd Edition, John Wiley & Sons, New York pp 11–12). The switches consist of an adequate number of thyristors to withstand the differential voltage between the phases, and the phase currents, and to allow current reversal. They can be regarded as truly bi-directional components with the options of jointly using additional wiring such as snubbers or the power supplies for the drive pulses for the antiparallel components.

The switches are arranged in an (m×n)-matrix at m phases of the source and n phases of the load. This provides the option of establishing any desired connections between the input phases and the output phases; however at the same time it has the disadvantage in that certain switching states of the matrix must not be allowed since otherwise for example a short circuit would result. Furthermore it is desirable to carry out commutation from one phase to another phase such that the lowest possible switching losses result.

U.S. Pat. No. 5,594,636 describes a matrix converter and a process for its operation in which commutation between the phases is partly carried out as a natural commutation, with a forced commutation where natural commutation is not possible. Although with this type of selection, switching losses are reduced due to natural commutation, those switching losses which arise from forced commutation still remain. Furthermore, the possible forced commutation necessitates the use, in all positions on the matrix, of components which can be switched off. This considerably increases the switching expenditure.

PRESENTATION OF THE INVENTION

It is thus the object of the invention to disclose a method for operating a matrix converter, and a matrix converter, which avoid the disadvantages of the known matrix converter solutions and which in particular allows for completely natural commutation between the phases.

This object is met by the entirety of the characteristics of claims 1 and 5. The essence of the invention consists of allowing commutation from one phase to another phase only if such commutation can be carried out as a natural commutation, and of stating a condition for it which can be expressed in a simple way in easily measurable quantities of the matrix converter, and can therefore be easily verified.

A preferred embodiment of the method according to the invention is characterised in that the switching state of the switches, the connection state of the phases of the source, and, for the proof of the condition $$I_k \cdot (V_k - V_l) \cdot K_{ijkl} < 0,$$

the signs of the currents in the phases of the source, and the signs of the differential voltages between the phases of the source, are continuously monitored or measured; that always a point in time is predetermined at which a switch-over shall take place, and that a switch-over of one or more elected phases only takes place at the predetermined point in time when the condition is met at that point in time, and that the switch-over otherwise takes place at a later point in time at which the condition is met. In particular antiparallel thyristors are used as bi-directional switches.

Further embodiments result from the dependent claims.

BRIEF EXPLANATION OF THE FIGURES

Below, the invention is explained in more detail by means of embodiments in conjunction with the drawing, as follows.

WAYS OF IMPLEMENTING THE INVENTION

Figure 2:
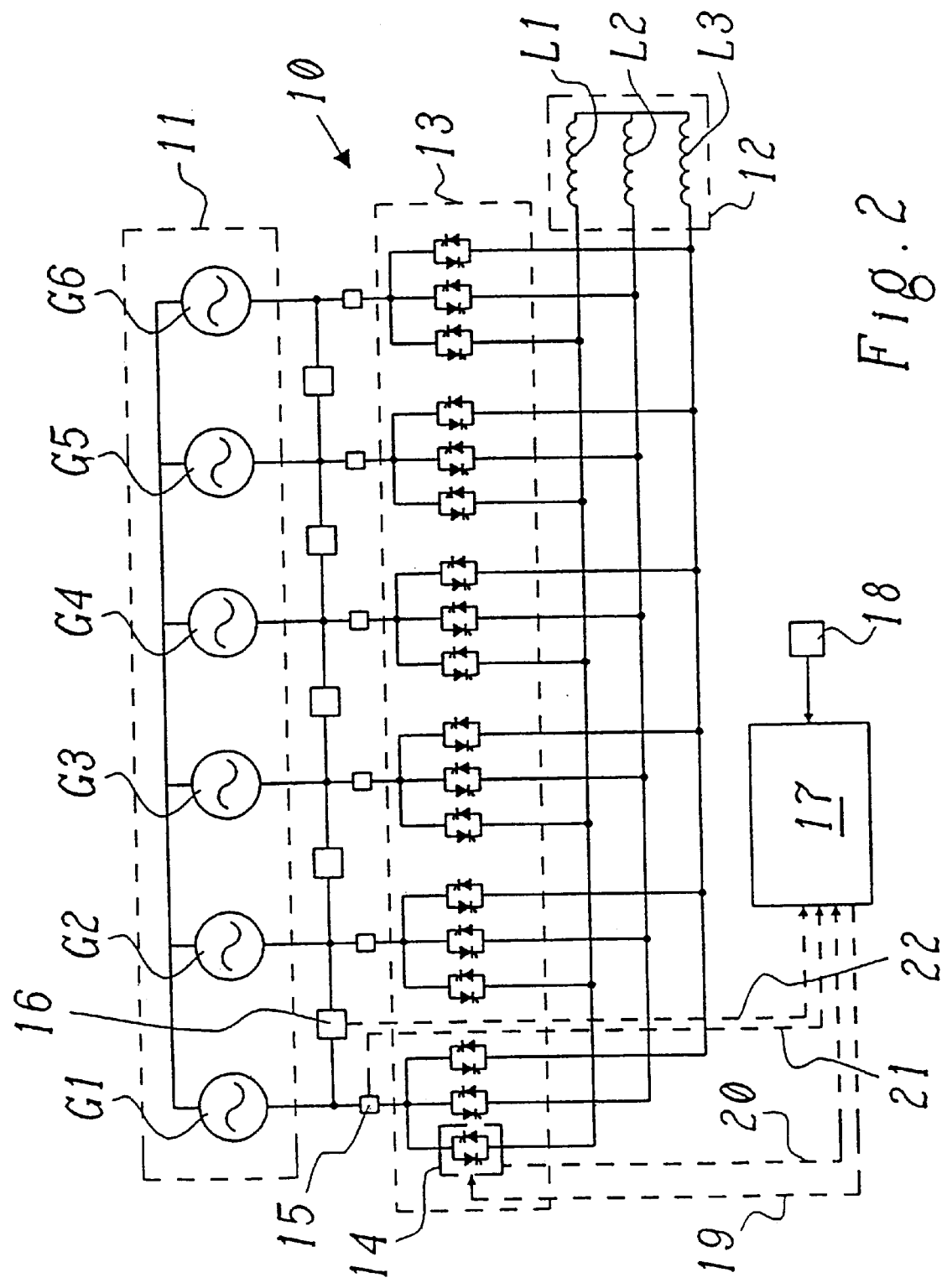
FIG. 2 shows the schematic circuit diagram of a matrix converter with 6 input phases and 3 output phases according to a preferred embodiment of the invention.

FIG. 2 shows a schematic circuit diagram of a matrix converter comprising 6 input phases and 3 output phases according to a preferred embodiment of the invention. The matrix converter 10 in a time sequence connects 6 phases G1, . . . ,G6 of a generator 11 as a source to 3 phases L1, . . . ,L3 of a load 12. The power component 13 required for it comprises 18 bi-directional switches 14 in the form of antiparallel switched thyristors (in general there are m×n switches for m input/source phases and n output/load phases). The switches 14 are arranged in a (6×3) matrix (in general: m×n matrix). A control system 17 is provided for selecting the switches 14, said control receiving time signals from a clock 18 (a clock frequency). The switching state of the switches 14 (ON, OFF) is monitored and in each case reported to the control system 17 via a first signal line 20. In each instance the switches 14 are selected by the control system 17 via a control line 19.

In each of the individual phases G1, . . . ,G6 of the generator 11, a current measuring device 15 is arranged in each instance which reports the sign of the phase current via a second signal line 21, to the control system 17. In addition, voltage measuring devices 16 are arranged between the phases G1, . . . ,G6 of the generator 11, said voltage measuring devices reporting the sign of the respective phase difference voltage to the control system 17 via a third signal line 22.

The matrix converter 10 generates an output or grid frequency $f_s$, which is related to the rotary speed $f_r$ of the rotor, the number p of the pole pairs, the commutation frequency $f_c$ between the phases, and the number of phases. If the stator permits z phases, the connecting circuit must commute z phases by rotation, i.e.

$$f_c = z \cdot (f_r/p - f_s). \tag{1}$$

This results in the time $t_c$ between two commutations to $t_c = 1/f_c$.

Below, a commutation criterion is derived for commutation within the matrix converter 10, said commutation criterion being essentially based on the sign of the product of the phase difference voltage between the phase to be switched off and the phase to be switched on and of the phase current in the phase to be switched off. If this product is negative, commutation between these two phases is allowed. Otherwise commutation is prohibited. Commutation is triggered by the control system 17, if a commutation is present after a specified time and if the commutation criterion is met.

Since for commutation a "free" phase of the generator 11 is required and since in each instance certain switches 14 must not be activated, so as to avoid short circuits, the control system 17 must know at all times which of the phases G1, . . . ,G6 are free, i.e. in which of the phases G1, . . . ,G6 all associated switches 14 are open, i.e. not carrying any power. The control system 17 must also know to which of the output phases L1, . . . ,L3 the phase which is to be commuted is switched, so as to precisely switch on that switch which is suitable for this commutation.

For a generator 11 with 5 phases (in the case of 3 phases L1, . . . ,L3 of the load 12) a maximum of two simultaneous commutations are possible; in the case of 6 phases (see FIG. 2) a maximum of three simultaneous commutations are possible. If no more than two commutations are possible, the respective switches 14 are activated simultaneously. In principle, three simultaneous commutations are not allowed. However, the third commutation can be carried out if one of the two first commutations is completed and the above-mentioned commutation criterion is met.

These different boundary conditions make it possible via the matrix converter 10 to realise a frequency change without any problems by means of the switches 14 or by means of the thyristor pairs. The control system 17 determines the thyristors which have to be closed, by evaluating the following information:

the speed of the rotor and the desired frequency at the output determine the points in time when commutations between the phases are to take place;

the sign or the disappearance of the currents in the phases G1, . . . ,G6 of the generator 11 and the phase difference voltages make it possible to know:

which phases are "free" and which phases are already used;

whether the commutation criterion has been met; and how many phases are already used in order to prevent three simultaneous commutations;

the switched-on thyristors make it possible to know which phases of the generator 11 are connected to which phases of the load 12.

The above-mentioned commutation criterion is based on the physical premise that a natural commutation between two phases of the generator 11 can only be carried out successfully if at the point of time of commutation to the absolute value of the current $i_{Gx}$ of the phase Gx from which one wants to commutate, is falling, while the absolute value of the current $i_{Gy}$ of the phase Gy to which one wants to commutate, is rising.

$$|i_{Gx}(t_0+\epsilon)|-|i_{Gx}(t_0)|<0 \text{ and } |i_{Gy}(t_0+\epsilon)|-|i_{Gy}(t_0)|>0, \epsilon \in ]0, \delta t_0[. \quad (2)$$

This necessary condition means that the phase to which one wants to commutate, has a higher electromotive force than, and the same sense of direction as, the phase from which one wants to commutate. However, since the electromotive force can only be measured during idling, the criterion is to be established with easily accessible or measurable quantities.

Figure 1:
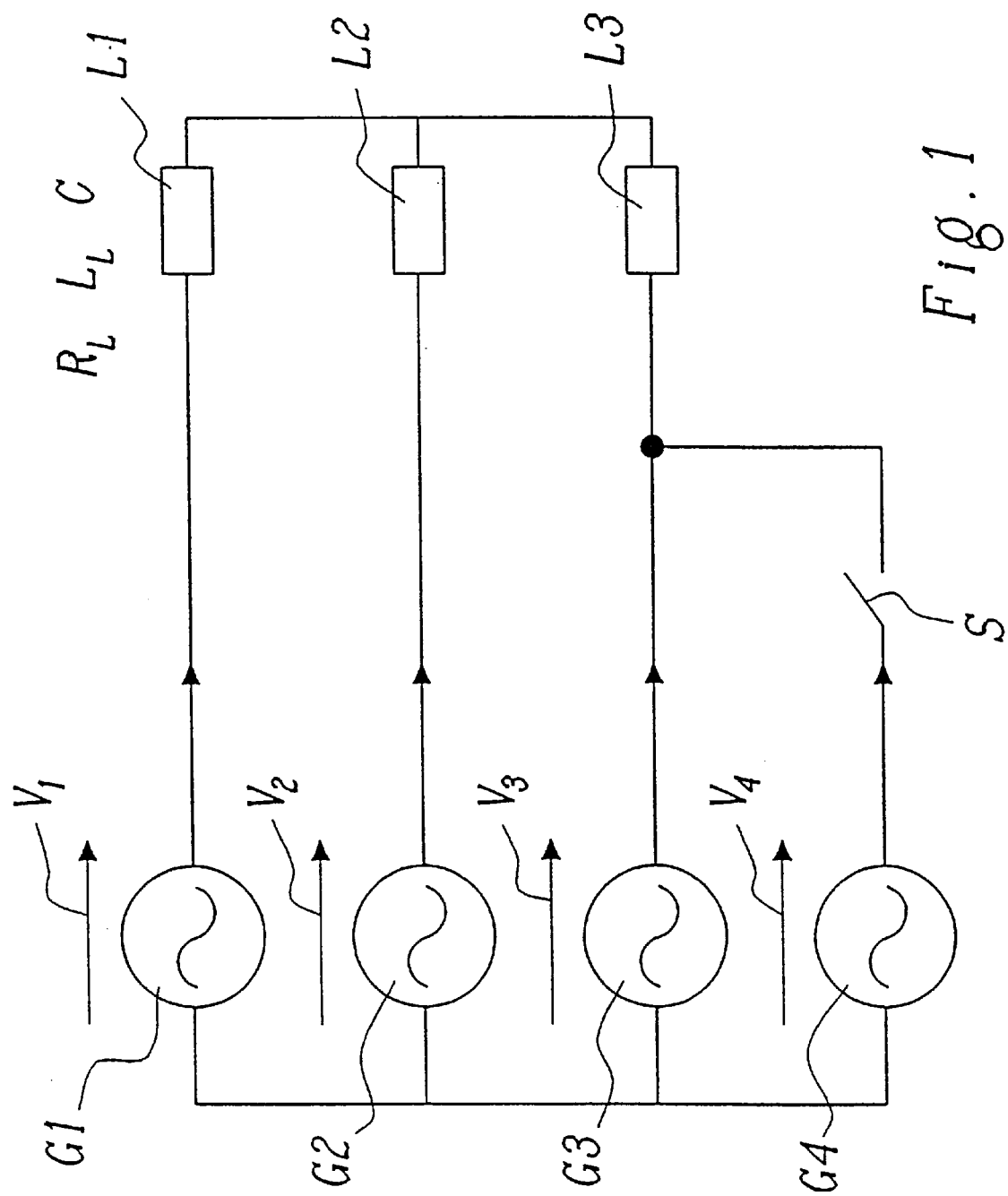
FIG. 1 is a diagrammatic representation of the commutation with a converter comprising 4 input phases and 3 output phases, said commutation being used to derive the commutation condition according to the invention.

This is to take place for the simplest case, as shown in FIG. 1 below, in which case the generator comprises 4 phases G1, . . . ,G4, and the load comprises three phases L1, . . . ,L3. The 4 phases G1, . . . ,G4 on the input side are connected in a star connection. Before commutation (switch S of phase G4 open) phases G1, . . . ,G3 are connected to the phases L1, . . . ,L3, phase G4 is "free". With commutation (by closing switch S), commutation from phase G3 to phase G4 is to take place. If the load comprises resistance $R_L$, inductance $L_L$ and capacity C, and if self-inductance and mutual inductance of the 4-phase generator can be described by the matrix $$\begin{bmatrix} L & M_{12} & M_{13} & M_{14} \\ M_{12} & L & M_{23} & M_{24} \\ M_{13} & M_{23} & L & M_{34} \\ M_{14} & M_{24} & M_{34} & L \end{bmatrix} \quad (3)$$

the phase voltages are $V_1$, . . . ,$V_4$ and the following continues to apply:

$$V_\alpha(t_0+\epsilon)=V_\alpha(t_0)+\delta V_\alpha \quad (4)$$

and $$\frac{di_\alpha(t_0+\epsilon)}{dt} = \frac{di_\alpha(t_0)}{dt} + \frac{d\delta i_\alpha}{dt}, \alpha = 1, \ldots, 4 \quad (5)$$

then the following system of equations can be stated, whereby instead of the indices 1, . . . , 4, the general indices i,j,k,l are used:

$$\begin{bmatrix} 1 & 1 & 1 & 1 \\ -(L+L_c-M_{ij}) & L+L_c-M_{ij} & M_{jk}-M_{ik} & M_{ji}-M_{il} \\ M_{ik}-M_{ij} & -(L+L_c-M_{jk}) & L+L_c-M_{jk} & M_{kl}-M_{ji} \\ M_{ik}-M_{il} & -(L-M_{kl}) & L-M_{kl} & M_{jk}-M_{ji} \end{bmatrix} \quad (6)$$

$$\begin{bmatrix} \frac{d\delta I_i}{dt} \\ \frac{d\delta I_j}{dt} \\ \frac{d\delta I_k}{dt} \\ \frac{d\delta I_l}{dt} \end{bmatrix} = \begin{bmatrix} 0 \\ 0 \\ 0 \\ V_k-V_l \end{bmatrix} \text{ or}$$

$$[A_{ij}] \cdot \begin{bmatrix} \frac{d\delta I_i}{dt} \\ \frac{d\delta I_j}{dt} \\ \frac{d\delta I_k}{dt} \\ \frac{d\delta I_l}{dt} \end{bmatrix} = (V_k-V_l) \begin{bmatrix} 0 \\ 0 \\ 0 \\ 1 \end{bmatrix}. \quad (7)$$

Provided the matrix $[A_{ij}]$ is not singular, the system of equations can be resolved to:

$$\begin{bmatrix} \frac{d\delta I_i}{dt} \\ \frac{d\delta I_j}{dt} \\ \frac{d\delta I_k}{dt} \\ \frac{d\delta I_l}{dt} \end{bmatrix} = (V_k-V_l) \cdot [A_{ij}]^{-1} \begin{bmatrix} 0 \\ 0 \\ 0 \\ 1 \end{bmatrix} \quad (8)$$

There exists thus a constant $K_{ijkl}$ such that $$\frac{d\delta I_k}{dt} = (V_k-V_l) \cdot K_{ijkl} \quad (9)$$

applies, with the constant $K_{ijkl}$ depending on the mutual inductances of the phases of the generator and the inductance of the load.

For a natural commutation to be able to be carried out successfully, it is necessary that the current $I_k$ of the phase from which commutation is to take place, after commutation passes through zero. This is expressed in the condition:

$$\frac{d\delta I_k}{dt} \cdot \frac{dI_k}{dt} < 0 \quad (10)$$

In conjunction with equation (9) we arrive at the commutation criterion:

$$I_k \cdot (V_k-V_l) \cdot K_{ijkl} < 0 \quad (11)$$

Thus if the constants $K_{ijkl}$ determined by the self-inductances and mutual inductances of the generator and the load are known, by means of the easily measurable quantities phase current $I_k$ and phase difference voltage $V_k-V_l$ signs it can be determined at all times whether or not an intended natural commutation between the phases k and l of the generator can be carried out (the indices i and j refer to those two phases which do not take part in the commutation process between the phases k and l; however, if there are more than four phases, there are more than two indices, respectively). The condition or rule (11) only depends on the signs of the currents and voltages, not however on their actual values. Thus the information necessary for the commutation condition can be obtained with very simple detectors or measuring devices.

As a result of a combination of sequential commutations, the path of the stator currents rotates around the generator axis. The armature reaction already rotates with a constant module at 50 or 60 Hz, i.e. the mains frequency. The rotation of stator current paths is added to the 50/60 Hz rotation resulting in a rotation of the armature reaction with a clearly different frequency which can be set by changing the commutation rate. This makes possible both synchronous and asynchronous operation.

The decision process which in the case of a matrix converter 10 according to FIG. 2 leads to selection of the switches 14, is very simple:

First the clock 18 tells the control system 17 at what point in time according to the desired frequency and if applicable according to any feedback information, a new commutation is to take place, i.e. at what point in time the phases presently connected to the load 12 are to be replaced by other phases.

As a result of continuous monitoring of the switches 14 and the phases G1, . . . ,G6, the control system 17 knows which phases are free, i.e. do not carry any current, and which phases can subsequently be safely commutated. If one or two commutations are possible, the associated switches 14 are triggered. If the commutation criterion (11) is not met at that point in time the commutation takes place at a later point in time when the criterion is actually met. As has already been mentioned above, simultaneous commutation of three phases is avoided. Any second and third commutations (possible per se) are postponed until they can be carried out safely.

A synchronous machine connected to the matrix converter 10 can be operated either as a motor or as a generator. It can be switched from motor operation to generator operation and can thus be used as a starter motor. Both lead and lag operations are possible without changing the control method. Autonomous operation is also possible in which the voltage is determined by excitation of the generator and frequency control is divided between the generator 11 and the converter.

In the case of induction machines, attention must be paid to the voltage during the start-up process. The average voltage can be reduced for instance by delayed triggering of the thyristors during current reversal.

In the case of drive motors there are two options of implementing the same principle. One option involves the use of a transformer with two secondary windings to generate a 6-phase network from a 3-phase network. Another option is the use of an n-phase motor directly connected to the mains via the matrix converter.

Harmonic disturbances are reduced if commutation is only allowed between adjacent phases. If the number of phases present is low, the probability of permitted commutation is low, thus limiting the achievable frequency range accordingly. But even in the case of 4 phases the entire frequency range is accessible if commutations are permitted also between non-adjacent phases. Harmonic disturbances are also reduced if the number of phases is increased. This results in more opportunities for permitted commutation, thus enlarging the frequency range. However, because the costs of the converter are closely linked to the number of phases, a sensible compromise between the number of phases and the filtering effort must be found.

With the proposed matrix converter, the forward losses can be reduced by a factor of 2 compared to conventional converters. Reduction of the commutation losses depends on the respective application. In the case of a 6-phase 85 Hz generator which is converted to 3-phase 50 Hz, there is a reduction in commutation losses in excess of a factor of 2 when compared to a 12-pulse rectifier/inverter.

The proposed matrix converter does not have any inherent reactive power consumption. The cyclo-converter for example, which also carries out a direct AC/AC conversion has a very small power factor due to the trigger delays necessary to achieve a sine-shaped voltage. Indirect converters also display a reduced power factor due to the margin of commutation and the magnetisation power necessary for chopping the direct currents.

Overall, the invention provides the following advantages:

(1) concerning the cyclo-converter:
The power factor of the converter is almost 1 instead of 0.7, so that the input power, the power of the components and the loss power are reduced.
Irrespective of the improved power factor, the new conversion process brings about inherent losses which are reduced by a factor of 2, thus allowing a lighter and more cost-effective cooling system.
The output frequency is not limited to ⅓ of the input frequency.
The control electronics are very simple.

(2) concerning the indirect AC/DC/AC converter:
The power factors on the input side and on the output side are the same, so that input power and power range of the components are minimised.
Operation is completely reversible.
There is no intermediate storage of energy, which results in cost savings and prevention of losses.
There are no pulsating torques, only a low content of harmonics and no decrease of power at the input due to chopped direct currents.
Slight loss power.

The new converter concept has thus the potential to further increase the attractiveness of static frequency converter solutions.

| LIST OF REFERENCES | |
|---|---|
| 10 | Matrix converter |
| 11 | Generator |
| 12 | Load |
| 13 | Power component |
| 14 | Switch (bi-directional) |
| 15 | Current measuring device |
| 16 | Voltage measuring device |
| 17 | Control system |
| 18 | Clock |
| 19 | Control line |
| 20, . . . , 22 | Signal line |
| G1, . . . , G6 | Phase (generator) |
| L1, . . . , L3 | Phase (load) |
| S | Switch |
| $V_i, \ldots, V_I$ | Voltage (generator/source phase) |

What is claimed is:

1. A method for operating a matrix converter in which m phases of a source delivering alternating voltage are alternatingly connected with n phases of a load via a multiple number of controllable bidirectional switches arranged in an (m×n) matrix, comprising:

switching over from a first phase of the source to a second phase of the source only when the condition $$I_k \cdot (V_k - V_l) \cdot K_{ijkl} < 0$$

is met, where $I_k$ and $V_k$ are the current and the voltage of the first phase, $V_l$ is the voltage of the second phase and in each instance $K_{ijkl}$ is a characteristic constant for the mutual inductance between the phases of the source and the inductance of the load.

2. The method according to claim 1, comprising:

continuously monitoring or measuring the switching state of the switches, the connection state of the phases of the source, and, for the proof of the condition $$I_k \cdot (V_k - V_l) \cdot K_{ijkl} < 0,$$

the signs of the currents in the phases of the source, and the signs of the differential voltages between the phases of the source;

wherein a) always a point in time is predetermined at which a switch-over shall take place, and b) a switch-over of one or more elected phases only takes place at the predetermined point in time when the condition is met at that point in time, and otherwise the switch-over takes place at a later point in time at which the condition is met.

3. The method according to claim 1, wherein the source is a generator, and the number m of phases of the generator is greater than the number n of phases of the load.

4. The method according to claim 1, wherein antiparallel thyristors are used as bidirectional switches.

5. A matrix converter for implementing the method comprising:

a plurality of controllable bidirectional switches arranged in an (m×n) matrix and controlled by a control unit, wherein the switches are arranged to selectably connect m inputs with n outputs;

first means for determining the signs of the currents in the inputs; and second means for determining the signs of the voltages between the inputs are provided;

wherein the first and second means are in active connection with the control system.

6. The matrix converter according to claim 5, wherein the switches are connected to the control system via a signal line by way of which information concerning the switch state of the switches is transmitted to the control system.

7. The matrix switch according to claim 5, wherein the bidirectional switches comprise antiparallel-switched thyristors.

* * * * *